(12) United States Patent
Kroehnert et al.

(10) Patent No.: US 7,966,113 B2
(45) Date of Patent: Jun. 21, 2011

(54) VEHICLE STABILITY CONTROL SYSTEM

(75) Inventors: Michael Kroehnert, Farmington Hills, MI (US); Siegfried Jauch, Commerce Township, MI (US); Flavio Nardi, Farmington Hills, MI (US); Andris Samsons, Ann Arbor, MI (US); Vaughan Scott, Royal Oaks, MI (US)

(73) Assignee: Robert Bosch GmbH, Stuttgart (DE)

( * ) Notice: Subject to any disclaimer, the term of this patent is extended or adjusted under 35 U.S.C. 154(b) by 1525 days.

(21) Appl. No.: 11/211,407

(22) Filed: Aug. 25, 2005

(65) Prior Publication Data

US 2007/0050112 A1    Mar. 1, 2007

(51) Int. Cl.
*B62D 6/00*    (2006.01)
*B62D 11/00*    (2006.01)
*B62D 12/00*    (2006.01)

(52) U.S. Cl. ............... 701/41; 701/48; 701/70; 701/84; 701/89

(58) Field of Classification Search ............ 701/41, 701/48, 70, 84, 89; 303/113.2, 114.1, 139, 303/145, 146, 142, 150, 151, 191; 180/197
See application file for complete search history.

(56) References Cited

U.S. PATENT DOCUMENTS

| | | | |
|---|---|---|---|
| 4,754,834 A | 7/1988 | Ozaki et al. | |
| 4,809,183 A | 2/1989 | Eckert | |
| 5,041,978 A | 8/1991 | Nakayama et al. | |
| 5,137,105 A | 8/1992 | Suzuki et al. | |
| 5,245,542 A | 9/1993 | Itoh et al. | |
| 5,259,476 A | 11/1993 | Matsuno et al. | |
| 5,272,635 A | 12/1993 | Nakayama | |
| 5,330,027 A | 7/1994 | Glover | |
| 5,346,032 A | 9/1994 | Sasaki | |
| 5,417,298 A * | 5/1995 | Shibahata ............... | 180/76 |
| 5,443,307 A | 8/1995 | Maier | |
| 5,448,478 A | 9/1995 | Eto | |
| 5,458,212 A | 10/1995 | Nishihara et al. | |
| 5,463,551 A | 10/1995 | Milunas | |
| 5,471,386 A | 11/1995 | Hrovat et al. | |
| 5,539,643 A | 7/1996 | Yamamoto et al. | |
| 5,682,316 A | 10/1997 | Hrovat et al. | |
| 5,711,023 A * | 1/1998 | Eckert et al. ............ | 701/70 |
| 5,711,024 A * | 1/1998 | Wanke ..................... | 701/82 |

(Continued)

FOREIGN PATENT DOCUMENTS

DE    10209884    3/2003

(Continued)

OTHER PUBLICATIONS

PCT/US2006/031952 International Search Report dated Mar. 6, 2008.

(Continued)

*Primary Examiner* — Khoi Tran
*Assistant Examiner* — Jorge O Peche
(74) *Attorney, Agent, or Firm* — Michael Best & Friedrich LLP (57) ABSTRACT

A vehicle stability system for a vehicle. In an embodiment the vehicle stability system includes a yaw rate sensor, an acceleration sensor, a steering sensor, a torque request sensor, and a controller. The controller is configured to receive an output of the yaw rate sensor, the lateral acceleration sensor, the steering sensor, and the torque request sensor, generate a torque signal and a braking signal, and transmit the torque signal to a differential in addition to transmitting the braking signal to a braking system.

8 Claims, 11 Drawing Sheets

U.S. PATENT DOCUMENTS

| | | | | |
|---|---|---|---|---|
| 5,711,025 | A * | 1/1998 | Eckert et al. | 701/83 |
| 5,740,877 | A | 4/1998 | Sasaki | |
| 5,742,917 | A | 4/1998 | Matsuno | |
| 5,826,209 | A | 10/1998 | Matsuno | |
| 5,862,503 | A | 1/1999 | Eckert et al. | |
| 5,867,803 | A | 2/1999 | Kim et al. | |
| 5,899,952 | A | 5/1999 | Fukada | |
| 5,925,083 | A | 7/1999 | Ackermann | |
| 6,023,650 | A | 2/2000 | Yamamoto et al. | |
| 6,059,688 | A * | 5/2000 | Nozaki et al. | 477/97 |
| 6,064,930 | A | 5/2000 | Shibahata | |
| 6,131,054 | A | 10/2000 | Shibahata | |
| 6,174,263 | B1 * | 1/2001 | Tabata et al. | 477/97 |
| 6,186,258 | B1 | 2/2001 | Deutschel et al. | |
| 6,195,606 | B1 | 2/2001 | Barta et al. | |
| 6,216,081 | B1 * | 4/2001 | Tabata et al. | 701/87 |
| 6,270,172 | B1 | 8/2001 | Shirai et al. | |
| 6,308,126 | B2 | 10/2001 | Yokoyama et al. | |
| 6,334,656 | B1 | 1/2002 | Furukawa et al. | |
| 6,366,844 | B1 | 4/2002 | Woywod et al. | |
| 6,397,152 | B1 | 5/2002 | Kalweit et al. | |
| 6,409,286 | B1 | 6/2002 | Fennel | |
| 6,415,215 | B1 * | 7/2002 | Nishizaki et al. | 701/70 |
| 6,539,298 | B2 | 3/2003 | Inagaki et al. | |
| 6,564,138 | B1 | 5/2003 | Schmitt et al. | |
| 6,584,399 | B2 | 6/2003 | Koibuchi | |
| 6,634,451 | B2 * | 10/2003 | Sakakiyama | 180/197 |
| 6,663,536 | B1 | 12/2003 | Meier | |
| 6,681,168 | B2 | 1/2004 | Polzin | |
| 6,691,013 | B1 * | 2/2004 | Brown | 701/70 |
| 6,694,227 | B2 | 2/2004 | Nowottnick et al. | |
| 6,697,728 | B2 | 2/2004 | Kin et al. | |
| 6,704,622 | B2 | 3/2004 | Tinskey et al. | |
| 6,705,685 | B1 | 3/2004 | Halat et al. | |
| 6,718,249 | B2 | 4/2004 | Herb et al. | |
| 6,755,488 | B2 | 6/2004 | Fawkes et al. | |
| 6,810,317 | B2 | 10/2004 | Sauter et al. | |
| 6,816,764 | B2 | 11/2004 | Coelingh et al. | |
| 6,895,318 | B1 * | 5/2005 | Barton et al. | 701/42 |
| 6,904,991 | B2 * | 6/2005 | Barth et al. | 180/197 |
| 2002/0045981 | A1 * | 4/2002 | Ichikawa et al. | 701/91 |
| 2002/0107628 | A1 * | 8/2002 | Sakakiyama | 701/89 |
| 2002/0153770 | A1 * | 10/2002 | Matsuno et al. | 303/146 |
| 2003/0036839 | A1 * | 2/2003 | Han et al. | 701/70 |
| 2003/0191572 | A1 * | 10/2003 | Roll et al. | 701/70 |
| 2003/0225495 | A1 * | 12/2003 | Coelingh et al. | 701/48 |
| 2003/0225496 | A1 * | 12/2003 | Coelingh et al. | 701/48 |
| 2004/0059494 | A1 * | 3/2004 | Yoneda | 701/89 |
| 2004/0176899 | A1 * | 9/2004 | Hallowell | 701/84 |
| 2004/0222027 | A1 * | 11/2004 | Barth et al. | 180/197 |
| 2004/0256913 | A1 * | 12/2004 | Schmidt et al. | 303/139 |
| 2004/0262067 | A1 * | 12/2004 | Sawada et al. | 180/282 |
| 2005/0004738 | A1 * | 1/2005 | Gronau et al. | 701/70 |
| 2005/0012386 | A1 * | 1/2005 | Nakano et al. | 303/114.1 |
| 2005/0029862 | A1 * | 2/2005 | Kato et al. | 303/146 |
| 2005/0033486 | A1 * | 2/2005 | Schmitt et al. | 701/1 |
| 2005/0209763 | A1 * | 9/2005 | Offerle et al. | 701/83 |
| 2005/0216157 | A1 * | 9/2005 | Sakata | 701/42 |
| 2005/0236894 | A1 * | 10/2005 | Lu et al. | 303/139 |
| 2005/0236896 | A1 * | 10/2005 | Offerle et al. | 303/146 |
| 2006/0000663 | A1 * | 1/2006 | Takimoto et al. | 180/446 |
| 2006/0076828 | A1 * | 4/2006 | Lu et al. | 303/146 |
| 2006/0178799 | A1 * | 8/2006 | Hoying et al. | 701/70 |

FOREIGN PATENT DOCUMENTS

| | | |
|---|---|---|
| DE | 10209884 A1 | 3/2003 |
| EP | 0922618 | 6/1999 |
| EP | 0922618 A2 | 6/1999 |
| JP | 4103436 | 4/1992 |

OTHER PUBLICATIONS

Direct Yaw Control System Improving Automotive Dynamic Performance; Press Information; May 29, 1996; pp. 1-14; Public Relation Division Honda Motor Col, Ltd. .

Larry Webster; Why Do These Similar Cars Feel So Different?; Car and Driver; Feb. 2005; pp. 70-71.

* cited by examiner

FIG. 11

VEHICLE STABILITY CONTROL SYSTEM

FIELD

Embodiments of the invention relate to vehicle stability control systems. More specifically, embodiments of the invention relate to methods of stabilizing a vehicle using a vehicle stability control system.

BACKGROUND

A variety of brake-, torque-, and drivetrain-based electronic stability control ("ESC") systems exist. A brake-based system may use an ESC algorithm to apply variable braking to all or some of the wheels in order to correct an unstable driving condition. A torque-based system may automatically reduce the torque that is supplied to an engine to correct an unstable driving condition. An electronically-controlled drivetrain may adjust the torque distribution to the wheels of the vehicle to correct an unstable driving condition.

SUMMARY

However, brake-, torque-, and drivetrain-based ESC systems are, in general, implemented separately, and exhibit undesirable characteristics that can impact the feel of the vehicle to the driver. For example, many brake-based systems are effective at stabilizing a vehicle, but may not do so with a desired smoothness. The drivetrain-based systems have the potential to adjust vehicle dynamics in response to driver input, but are often ineffective at high speeds. Therefore, improved systems are desirable.

The following summary sets forth certain example embodiments of the invention. It does not set forth all such embodiments and should in no way be construed as limiting of the invention.

In one embodiment, an integrated electronic stability control system that utilizes drivetrain-based torque control to each of the wheels of the vehicle in addition to initiating a braking function is provided. Such a system helps to improve the feel of the stability system to the driver. Such a system also helps increase the robustness of driving dynamics, reduce the workload on the driver, and reduce the need for brake-based stability control. In some instances, applying torque control before applying brake control is desirable.

In another embodiment, a vehicle stability system for a vehicle comprises a yaw rate sensor, an acceleration sensor, a steering sensor, a torque request sensor, and a controller. The yaw rate sensor is configured to generate an output indicative of a yaw rate of the vehicle. The acceleration sensor is configured to generate an output indicative of a lateral acceleration of the vehicle. The steering sensor is configured to generate an output indicative of a steering angle. The torque request sensor is configured to generate an output indicative of a torque request by a driver of the vehicle. The controller is configured to receive an output of the yaw rate sensor, the lateral acceleration sensor, the steering sensor, and the torque request sensor, generate a torque signal, and transmit the torque signal to a differential.

In yet another embodiment, a method of stabilizing a vehicle using a vehicle stability system comprises generating a target stability indicator, evaluating a vehicle driver input, determining the presence of an understeering condition, an oversteering condition, or both, establishing an instability indicator, determining a torque control, and applying the torque control. Applying the torque control may include transmitting a torque control signal. The target stability indicator represents a stable vehicle condition. The vehicle driver input evaluation is based at least partially on an accelerator input and a steering angle of the vehicle. Determining the presence of an understeering condition, an oversteering condition, or both is based at least partially on a lateral acceleration of the vehicle, a yaw rate of the vehicle, a longitudinal velocity of the vehicle, and the vehicle driver input. Establishing an instability indicator is based on whether an understeering condition, an oversteering condition, or both exists. Determining a torque control is based at least partially on the instability indicator, the target indicator, and the driver input evaluation.

In still another embodiment, a vehicle having at least four wheels including a left front wheel, a right front wheel, a left rear wheel, and a right rear wheel, and also having a vehicle stability system that includes a braking function and a torque control function comprises a steering wheel angle sensor, a yaw rate sensor, an acceleration sensor, at least one wheel speed sensor, and a controller. The steering angle sensor is configured to sense a steering angle of the vehicle and generate a steering signal indicative of the same. The yaw rate sensor is configured to sense a yaw rate of the vehicle and generate a yaw rate signal indicative of the same. The acceleration sensor is configured to sense a lateral acceleration of the vehicle and generate a lateral acceleration signal indicative of the same. At least one wheel speed sensor is configured to sense at least one wheel speed and generate a wheel speed signal indicative of the same. The controller is configured to receive the signal from the steering angle sensor, the signal from the yaw rate sensor, the output of the acceleration sensor, and the signal from the at least one wheel speed sensor and determine a stability correction. The stability correction comprises information to variably apply a torque to at least one of the left front wheel, the right front wheel, the left rear wheel, and the right rear wheel using the torque control function in addition to applying a brake to at least one of the left front wheel, the right front wheel, the left rear wheel, and the right rear wheel using the braking function.

Other embodiments will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, respectively.

Figure 1:
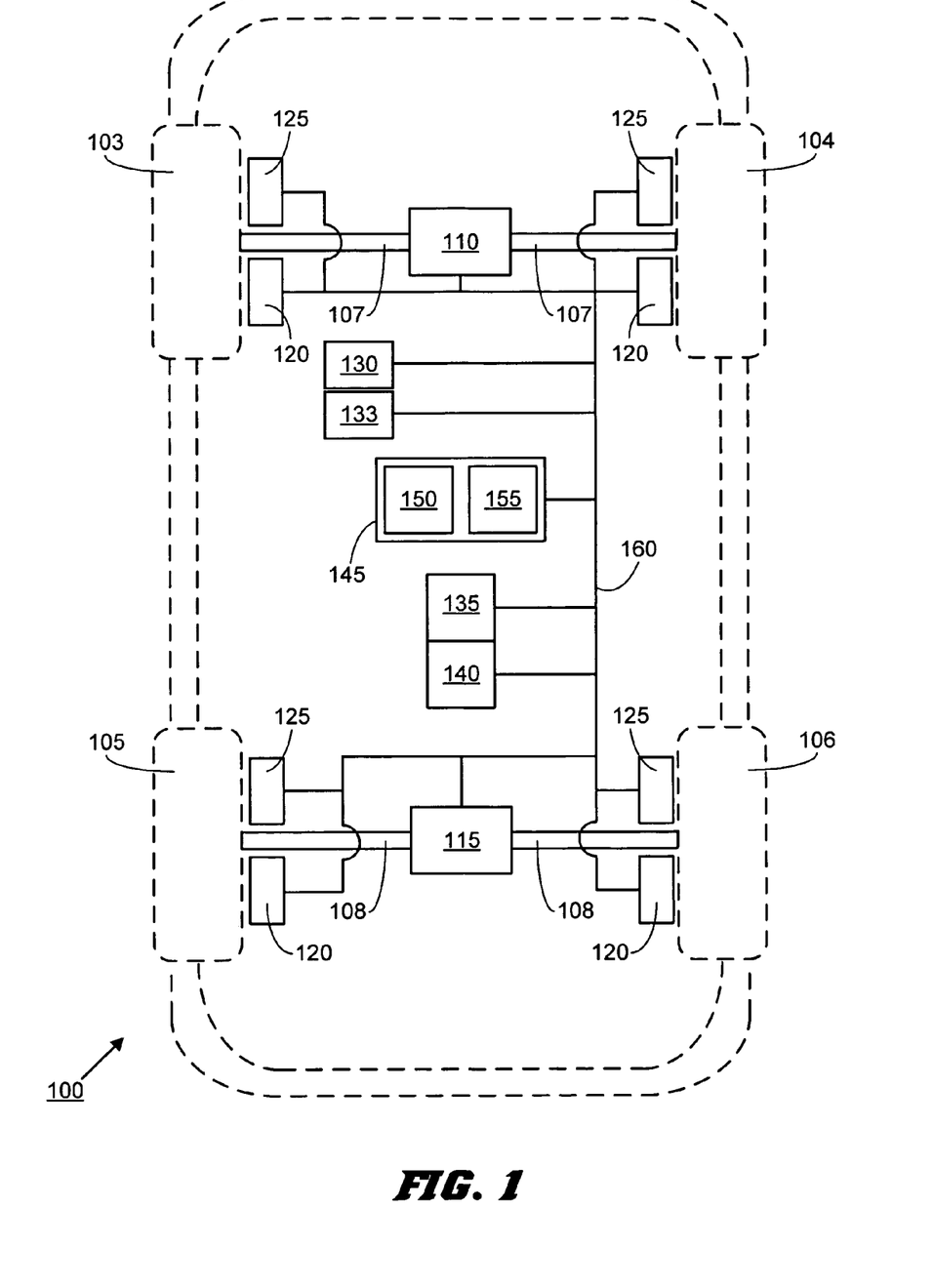
FIG. 1 illustrates a vehicle having an electronic stability control system.

FIG. 1 schematically illustrates an exemplary vehicle 100 having wheels 103, 104, 105, and 106. In other embodiments, the vehicle 100 can have more or fewer wheels than those shown, for example, a truck having two front wheels and four rear wheels. Other mechanical components of the vehicle 100 include a front axle 107, a rear axle 108, a front differential 110, a rear differential 115, and brakes 120. The front and rear differentials 110 and 115 can be clutch-type differentials. In some embodiments, the vehicle 100 may also include a center differential (not shown).

The front wheels 103 and 104 and rear wheels 105 and 106 are coupled to the front axle 107 and the rear axle 108, respectively. The axles 107 and 108 are coupled to the front differential 110 and the rear differential 115, respectively. The front and rear differentials 110 and 115 are coupled to a drive shaft (not shown) that is turned by an engine (also not shown). Therefore, the front differential 110 and rear differential 115 can be used to distribute varying amounts of torque to the front wheels 103 and 104 and rear wheels 105 and 106 through the axles 107 and 108. As commonly known in the art, torque is intended to refer to a force that produces a rotation of, or torsion to a drive shaft. In some embodiments, the torque that is generated by the engine can be distributed differently to the front differential 110 and the rear differential 115. This type of torque distribution may require a center differential (not shown). For example, the front differential 110 may receive 40 percent of the total torque that is produced by the engine, while the rear differential 115 may receive the remaining 60 percent of available torque. Additionally, in other embodiments, the amount of torque that is distributed to the front and rear wheels 103, 104, 105, and 106 can be varied on an individual basis. For example, the front differential 110 can be used to distribute a different amount of torque to each of the front wheels 103 and 104. Similarly, the rear differential 115 can be used to distribute a different amount of torque to each of the rear wheels 105 and 106. Therefore, it is possible to distribute different amounts of torque to each of the wheels 103, 104, 105, and 106.

The way in which torque is distributed is limited to the configuration of the vehicle. For example, some two-wheel drive vehicles 100 may only include a single differential, which controls either the front or rear wheels. In such embodiments, only the wheels that are coupled to a differential may receive different amounts of torque. Other vehicles may include multiple differentials or an all-wheel drive system, which can allow torque to be applied to all of the wheels.

The way in which the wheels are driven is not limited to differentials and driven axles coupled to a central engine. For example, each of the wheels 103-106 can be driven by a separate electric motor (not shown). The torque that is applied to the wheels 103-106, therefore, is dependent on the torque that each of the electric motors produces. Other ways of applying different amounts of torque to each of the wheels 103-106 should be apparent to those skilled in the art.

The brakes 120 can be used to apply a braking force to the wheels 103-106. In some embodiments, the braking force is distributed evenly between the front wheels 103 and 104 and the rear wheels 105 and 106 so that each of the wheels 103-106 receives approximately the same amount of braking force. Alternatively, a different amount of braking force can be applied to each of the front wheels 103-104, as well as to each of the rear wheels 105-106. Such an implementation may be accomplished using a brake-based ESC system or other electronic or computer control.

Some of the other mechanical components of the vehicle, such as the front differential 110, rear differential 115, or center differential (not shown) may also be electronically- or computer-controlled. For example, a differential can comprise an electromechanical or electro-hydraulic controllable coupling device, which includes mechanical and hydraulic components, as well as an integrated electronic control unit ("ECU"). Therefore, in some embodiments, the ECU of the differential is responsible for certain operations of the differential, for example, actuating the clutch within the differential, or measuring the amount of torque that is applied to the wheels 103-106.

Additional components of the vehicle 100 include wheel speed sensors 125, a steering angle sensor 130, an accelerator pedal sensor 133, a yaw rate sensor 135, an acceleration sensor 140 (e.g., accelerometer or lateral acceleration sensor), and a controller 145. In one embodiment, the controller 145 includes a braking module 150 and a torque control module 155. Certain functions of the brakes 120, the front differential 110, and the rear differential 120 may also be electronically controlled. Each of the components of the vehicle 100 can be electrically connected via a bus 160 (e.g., a controller area network ("CAN"), a local interconnect network ("LIN"), and the like). The bus 160 can be used to supply power and transfer data signals to each of the components that are connected on the system. In other embodiments, a vehicle-wide communication bus, such as the bus 160 is not required, and each of the vehicle components is connected using separate electrical connections.

Referring still to FIG. 1, the wheel speed sensors 125 can be used to transmit a signal to the controller 145 indicative of a rotational wheel speed. In some embodiments, each of the wheels 103-106 includes a separate wheel speed sensor 125. In other embodiments, fewer wheel speed sensors 125 are used. Additionally or alternatively, the speed of each of the wheels 103-106 may be measured in a different way, for example, by tracking the rotation of the drive shaft (not shown) or axles 107 and 108.

The steering angle sensor 130 is used to transmit a signal to the controller 145 indicative of a steering angle of the vehicle 100. For example, the steering angle sensor 130 may be used to transmit a signal to the controller 145 that corresponds to an angle at which the wheels 103 and 104 are turned. The angles at which other wheels are turned (e.g., the rear wheels) can also be monitored using additional steering angle sensors, if applicable. In one embodiment, the steering angle sensor 130 is a steering wheel sensor that monitors an angle at which a steering wheel of the vehicle (not shown) is turned. The angle of rotation of the steering wheel can be determined using relative or absolute position references. A steering wheel position, for example, that aligns the wheels 103 and 104 approximately perpendicular to the axle 107 may represent a zero degree mark. Each degree that the steering wheel is turned away from the zero degree mark can then be measured. Measuring the steering angle of the vehicle 100 with a steering wheel sensor represents only one possible method of measuring the steering angle. A sensing mechanism that is positioned further from the steering source (i.e., the steering wheel) could also be used to measure the steering angle. For example, a sensing mechanism could be used to measure the actual wheel position, and angle thereof, compared to a standard reference such as an axle.

The accelerator pedal sensor 133 is used to transmit a signal to the controller 145 indicative of a torque request by a driver, and/or an acceleration response by the vehicle 100. For example, if the driver of the vehicle 100 wishes to accelerate by increasing the torque that is applied to the wheels 103-106, an acceleration pedal (not shown) can be depressed. However, the torque request and corresponding vehicle response can also be measured in other ways. For example, a flow rate of fuel into the engine of the vehicle 100 can also be monitored. Generally, fuel flow rate can be correlated to torque. Alternatively or additionally, the position of a throttle cable may also be measured to indicate a torque request (and vehicle response). A torque request signal may also be sent from the acceleration pedal to the engine electronically (e.g., drive-by-wire system), and that signal could be used to indicate a torque request and vehicle response. Other ways to monitor a torque request and vehicle response should be apparent to those skilled in the art.

The yaw rate sensor 135 is used to transmit a yaw rate signal to the controller 145 indicative of a yaw rate of the vehicle. The term yaw rate is intended to describe a speed at which the vehicle 100 rotates about a vertical axis (i.e., a "z" axis that extends vertically through the vehicle 100, from the bottom to the top). The accelerometer 140 is used to sense the lateral (i.e., side-to-side with respect to the vehicle 100) accelerations of the vehicle 100, and transmit signals to the controller 145. Optionally, the accelerometer 140 could be configured to sense longitudinal acceleration as well. In some embodiments, the yaw rate sensor 135 and accelerometer 140 can be combined into a sensing module. Alternatively, the yaw rate sensor 130 and the accelerometer 140 may be separate modules that are positioned in different locations, depending on the vehicle 100 and the requirements of the sensors 135 and 140.

As previously described, the controller 145 can include a braking module 150 and a torque control module 155. The braking module 150 is responsible for controlling the actuation of the brakes 120. In some embodiments, the braking module 150 may include an antilock braking function which is responsible for modulating the brakes 120. The braking module 150 may also include an ESC braking function that is responsible to respond to changing driving conditions by applying variable amounts of braking to each of the wheels 103-106. Similarly, the torque control module 155 can determine a torque control function. The torque control function can determine, or inherently include, a torque value that can be transmitted to the front, rear, or center differential of the vehicle or a combination of differentials. Implementing the torque control function with the differential results in an alteration of the amount of torque that is applied to each wheel. Alternatively or additionally, the torque control function can determine, or inherently include, a torque value that can be transmitted to the engine of the vehicle. Implementing the torque control function with the engine may result in an alteration of the amount of torque that is produced by the engine.

It should be appreciated that the controller 145 may be a processor that executes computer executable programs (i.e., software) with the aid of an operating system (not illustrated). In other embodiments, the controller may comprise hardware, such that functions described herein are performed by hardware components. For example, the controller 145 may be implemented by an application-specific, integrated circuit ("ASIC"), firmware, dedicated components, or the like, as are known in the art. Thus, it will be appreciated that the controller 145 may be implemented in hardware, software, or a combination of the same. Additionally, the braking module 150 and torque control module 155 can be implemented using separate software programs, or combined into a single software program.

A braking function and/or a torque control function can be applied to correct an unstable vehicle condition. An unstable condition can be identified using a number of indicators. For example, an unstable condition may be identified by determining the presence of an understeering condition and/or an oversteering condition. An understeering condition may exist when the wheels of a vehicle are turned, but the vehicle does not follow the intended turning path and proceeds to travel forward instead of at the intended turning radius (i.e., the turning radius corresponding to the angle of the wheels). An oversteering condition may exist when the wheels of the vehicle are turned to a certain angle, but the vehicle does not follow the corresponding turning radius and proceeds to turn too sharply. Accordingly, the oversteering condition may result in excessive vehicle rotation and/or sideslip, causing the rear end of the vehicle to slide out. The driving conditions described above can commonly occur on surfaces with low coefficients of friction (e.g., a loose gravel surface, an icy surface, a snow-covered surface, and the like). An unstable driving condition may also be determined by examining other vehicle characteristics and conditions, such as wheel slippage, wheel speed, and accelerations.

Figure 2:
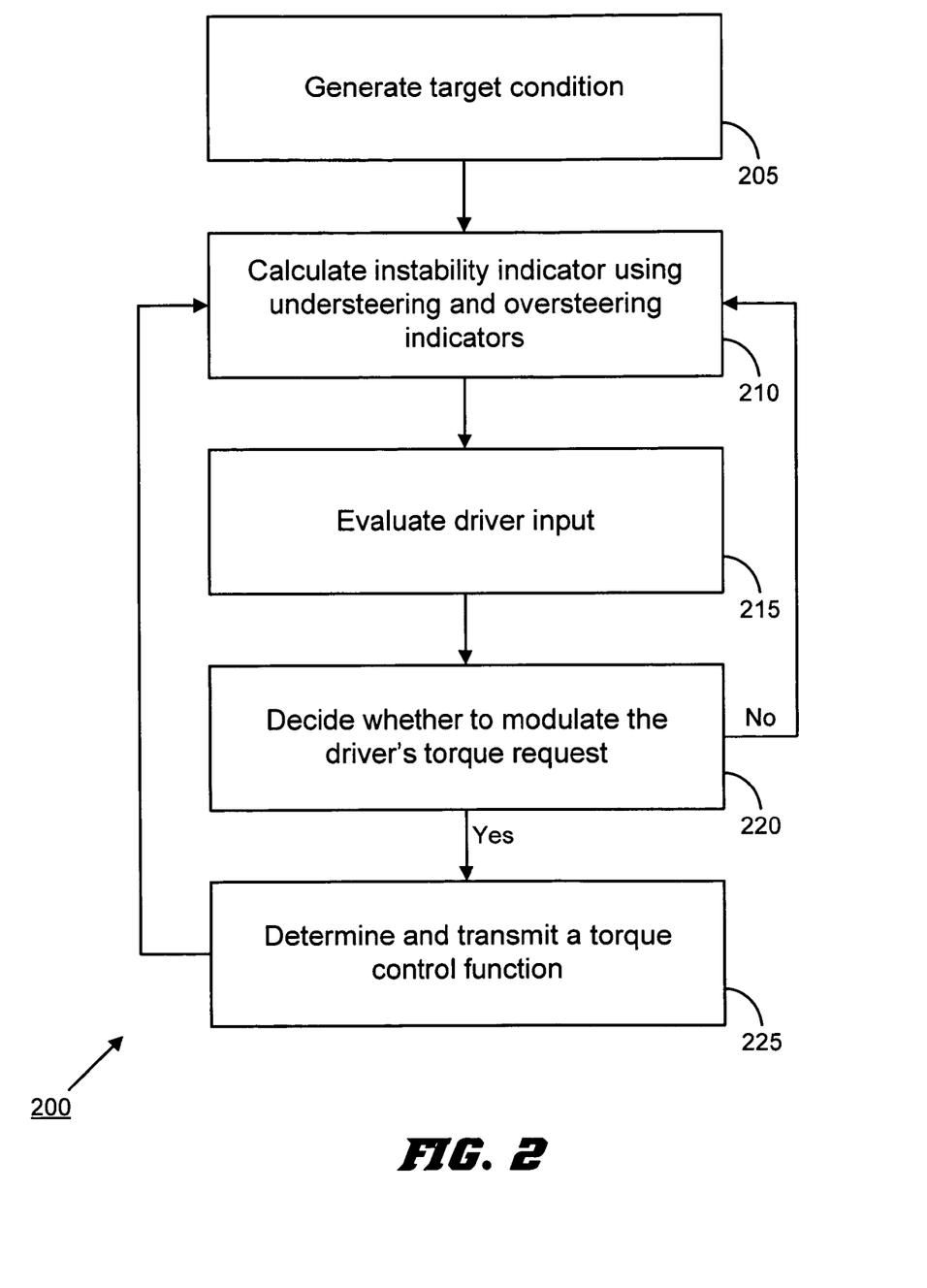
FIG. 2 illustrates an exemplary process that can be used to provide vehicle stability control.

FIG. 2 illustrates an exemplary vehicle torque control process 200 that can be used to control the torque that is applied to the wheels 103-106. In some embodiments, the process 200 is carried out by the torque control module 155. The process 200 generally includes generating a target condition (step 205), calculating an instability indicator using an understeering indicator and/or an oversteering indicator (step 210), evaluating a driver input (step 215), deciding to modulate the driver's torque request using the torque control module 155 (step 220), and transmitting a torque control function (step 225).

As noted, the first step of the process 200 is generating a target condition for the torque control function (step 205). The definition of the target condition may vary, and can be dependent on the vehicle 100, and the way in which an unstable condition is classified. The target condition should allow the vehicle to turn without excessively oversteering. For example, a system that identifies an unstable driving condition by determining the presence of an understeering or oversteering condition, as described above, may determine a target sideslip angle for the vehicle, which only allows a certain amount of lateral tire slip prior to initializing the torque control function. Another way to ensure that the vehicle does not oversteer while turning is to set a target yaw rate for the target condition. The target yaw rate may be determined using mathematical models, or through vehicle testing or simulations, as described in greater detail below.

Figure 3:
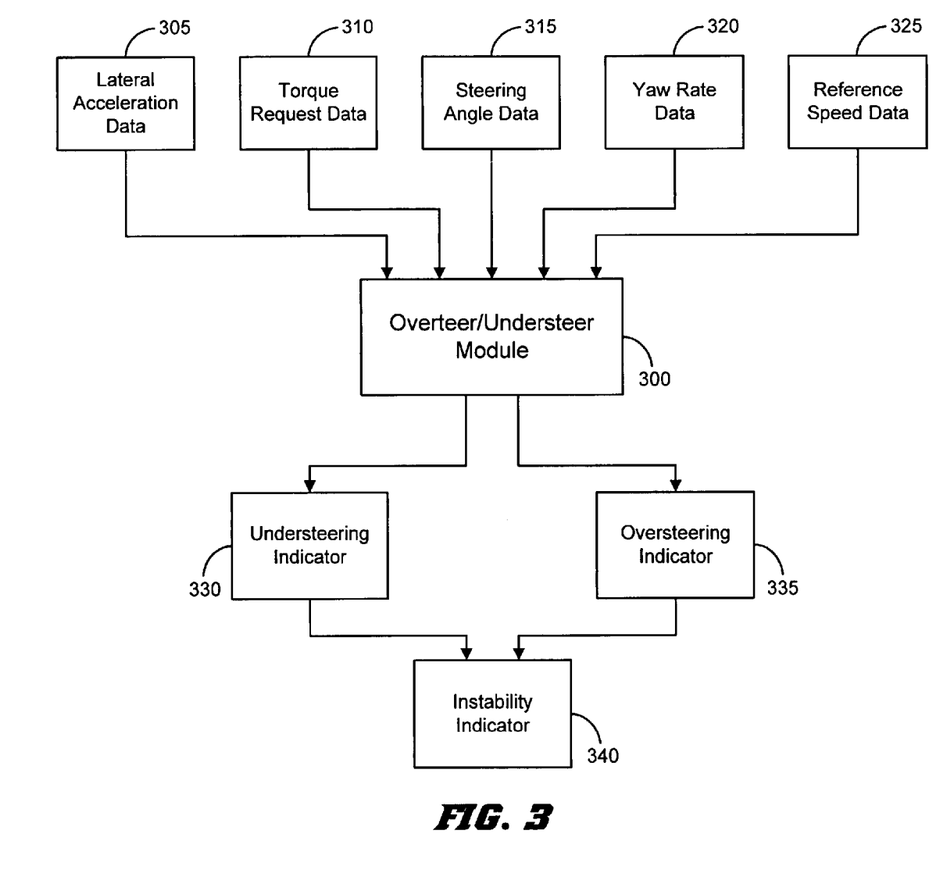
FIG. 3 illustrates an embodiment of an oversteering and understeering module.

In one embodiment, calculating an instability indicator using an oversteering variable and an understeering variable (step 210) can be carried out using an oversteering and understeering module 300, shown in FIG. 3. The oversteering and understeering module 300 can be used to generate the instability indicator needed for step 210 by carrying out sub-process 400, shown in FIG. 4.

Figure 4:
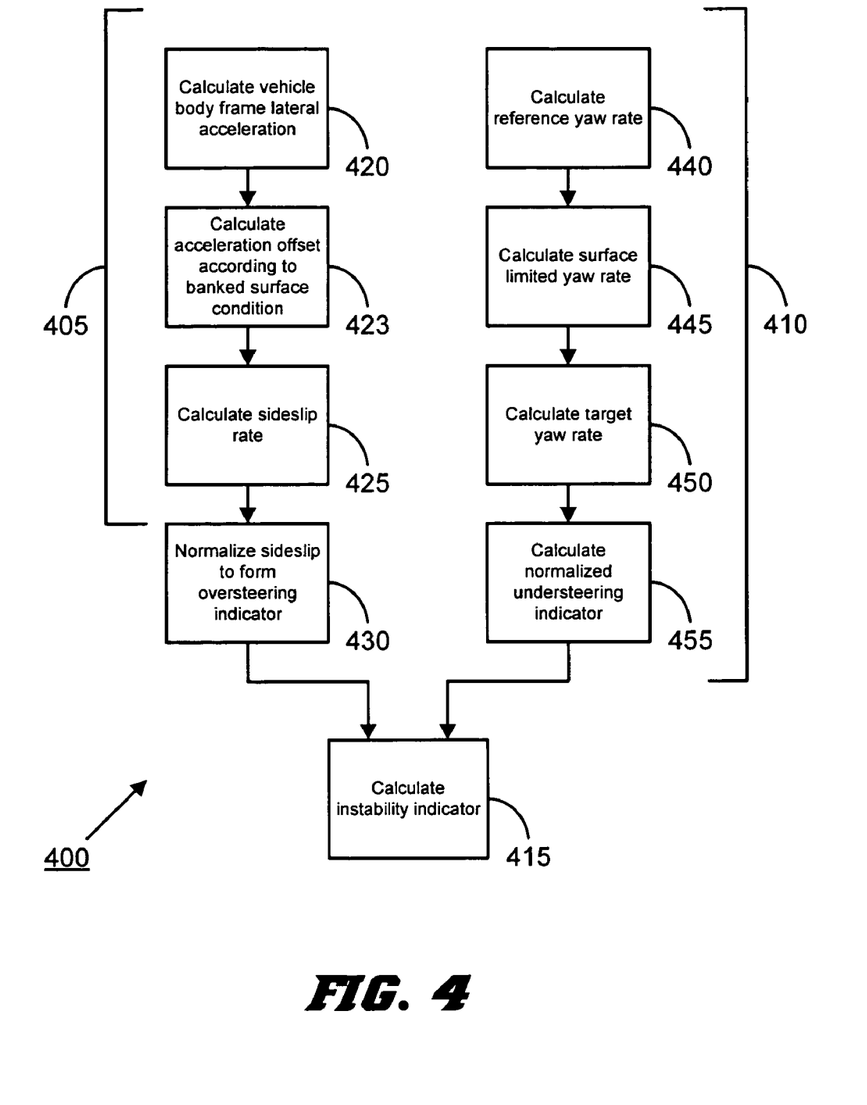
FIG. 4 illustrates an exemplary process that can be used to calculate an instability indicator.

Referring to FIG. 3, the oversteering and understeering module 300 utilizes a plurality of vehicle data to carry out the sub-process 400 (FIG. 4). The plurality of vehicle data may be acquired from the plurality of signals that are transmitted by the sensors shown in FIG. 1. In other embodiments, the vehicle data that is used by the oversteering and understeering module 300 is derived using mathematical equations and theoretical models. For example, in an embodiment, lateral acceleration data 305, torque request data 310, steering angle data 315, yaw rate data 320, and reference speed data 325, may be acquired using the accelerometer 140, the accelerator pedal position sensor 133, the steering angle sensor 130, the yaw rate sensor 135, and the wheel speed sensor(s) 125, respectively. Alternatively or additionally, the data 305-325 may be derived from mathematical equations and theoretical models, as described with respect to sub-process 400 in FIG. 4.

The data 305-325 can be used by the oversteering and understeering module 300 (implementing sub-process 400) to produce an understeering indicator 330 and an oversteering indicator 335. Additionally, the understeering indicator 330 and oversteering indicator 335 can be used to produce an instability indicator 340. The understeering indicator 330, oversteering indicator 335, and instability indicator 340 can all be indicative of unstable driving conditions, as described above. In some embodiments, the instability indicator 340 is the difference between the oversteering indicator 335 and the understeering indicator 330, as described in greater detail below.

Referring now to FIG. 4, the sub-process 400 can be carried out by the oversteering and understeering module 300 in order to form the oversteering indicator 335, understeering indicator 330, and instability indicator 340, as previously described. The process 400 can be split into an oversteering indicator process 405 and an understeering indicator process 410. The oversteering indicator process 405 and understeering process 410 can then be used to calculate the instability indictor (step 415).

The first step of the oversteering process 405 is calculating the lateral acceleration of the vehicle body frame (step 420). Equation (1), shown below, can be used to mathematically determine the lateral acceleration of the body frame of the vehicle ($\dot{v}_y$), using the lateral acceleration (i.e., the reference or inertial lateral acceleration) ($a_y$), the yaw rate of the vehicle ($\dot{\psi}$), and the estimated longitudinal velocity of the vehicle ($v_x$).

$$\dot{v}_y = a_y - v_x \dot{\psi} \tag{1}$$

Figure 5:
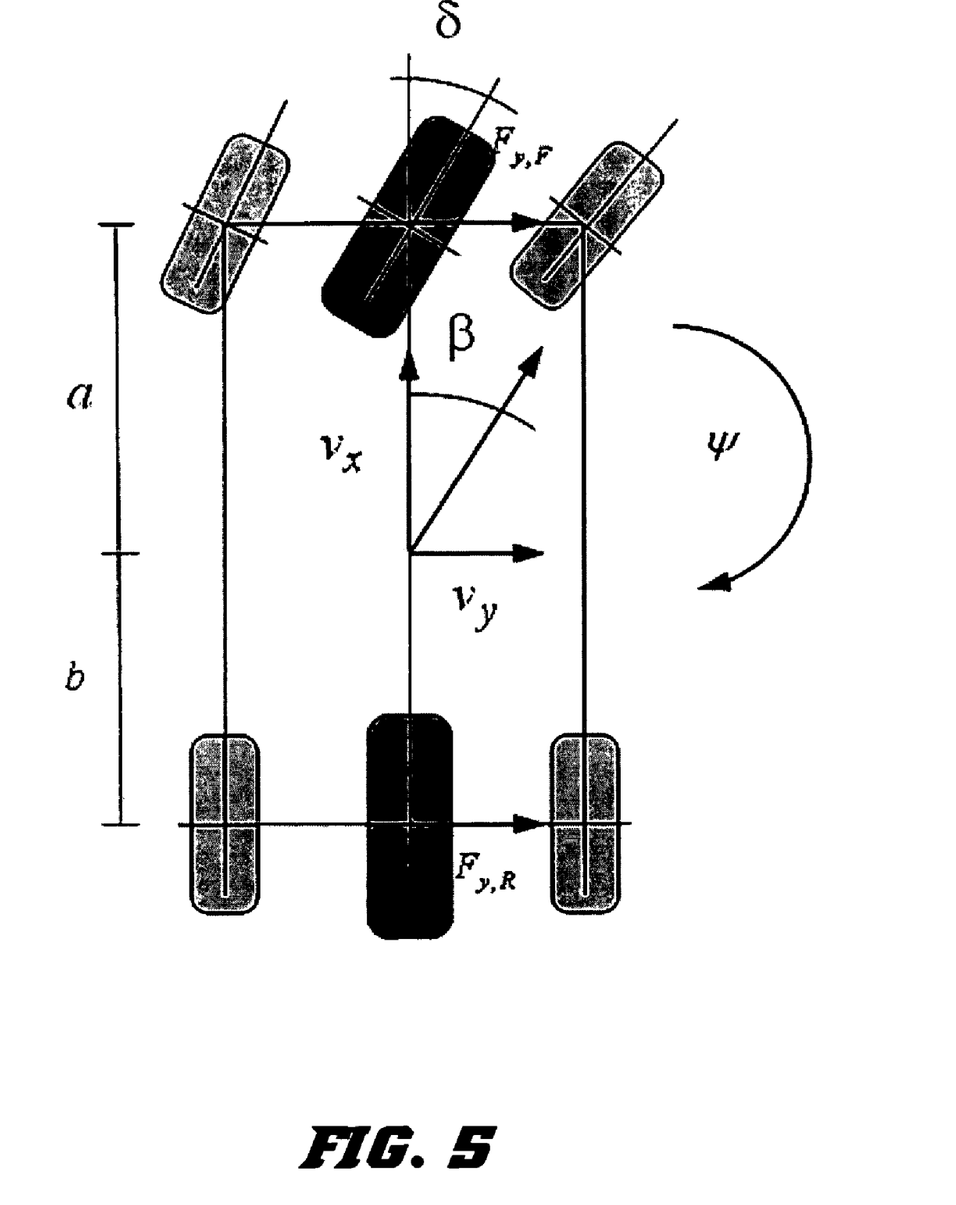
FIG. 5 illustrates an exemplary bicycle model that can be used to develop equations that describe behavior of a vehicle.

A simple bike track model 500, as shown in FIG. 5A, can be used to develop Equation (1) above. The bike track model 500 can also be used to develop other useful equations, as described below. After developing equations with the bike track model 500, similar equations can be developed by expanding the same concepts to a model having four wheels, which can be used for the vehicle 100. Other models and equations can be developed for vehicles having more or less than four wheels.

In some embodiments, the yaw rate sensor 135 is used to provide the yaw rate signal used in Equation (1). Additionally, the reference lateral acceleration ($a_y$) may be provided by the accelerometer 140. Calculating an estimated longitudinal velocity may require data from the wheel speed sensors 125, the yaw rate sensor 135, the steering angle sensor 130, or a combination thereof; the methods of which are known in the art. Therefore, in the interest of brevity, an estimated longitudinal velocity calculation is not provided herein. In some embodiments, the longitudinal velocity may be provided by another system, for example, the brake-based system.

In some embodiments, the lateral acceleration ($a_y$) may be offset to accommodate for travel around a banked curve. In such embodiments, the lateral acceleration offset is calculated (step 423) prior to calculating the sideslip rate ($\dot{\beta}$) (step 425). The next step of the oversteering process 405 is calculating the sideslip rate ($\dot{\beta}$) of the vehicle (step 425). Equation (2), shown below, can be used to determine an approximation of the sideslip rate ($\dot{\beta}$) using the yaw rate ($\dot{\psi}$), the lateral acceleration ($a_y$), and the longitudinal velocity ($v_x$).

$$\dot{\beta} \approx \dot{\psi} - \frac{a_y}{v_x} \tag{2}$$

As described above, the yaw rate sensor 135 can be used to provide the yaw rate ($\dot{\psi}$), and the longitudinal velocity ($v_x$) is calculated by another vehicle system. The lateral acceleration ($a_y$) is measured using the accelerometer 140.

After determining the sideslip rate ($\dot{\beta}$) of the vehicle (step 425), a normalized oversteering indicator 335 ($K_{os}$) can be developed (step 430). In one embodiment, the oversteering indicator 335 ($K_{os}$) is a normalized sideslip that is between 0 and 1. As shown below in Equation (3), a normalization gain ($C_{os}$) is used to scale the oversteering indicator 335 ($K_{os}$) to a value between 0 and 1, so that it may be more readily compared to an understeering indicator.

$$K_{os} = C_{os}\left(\dot{\psi} - \frac{a_y}{v_x}\right) \tag{3}$$

Relying only on the oversteering indicator 335 to determine an unstable driving condition may lead to early and false torque control function interventions. A different vehicle dynamics calculation (i.e., stability indication) also considers the amount of understeering that is occurring. For example, a torque reduction may not be desired if the vehicle is sliding laterally (i.e., sideways) only. Therefore, in some embodiments the understeering indicator 330 is also formed using the understeering process 410. In doing so, the differential lateral acceleration between the front and rear axles can be obtained, providing a more complete picture of the vehicle's stability condition.

The first step of the understeering process 410 is to calculate a reference yaw rate ($\dot{\psi}_{Ack}$) (step 440). In some embodiments, the reference yaw rate ($\dot{\psi}_{Ack}$) is an Ackerman yaw rate that is derived using a characteristic velocity value ($v_{ch}$). The characteristic velocity value ($v_{ch}$) is representative of the vehicle's steady state dynamics, which can be calculated using known methods. In one embodiment the characteristic velocity value ($v_{ch}$) can be determined using data from vehicle testing. For example, the characteristic velocity ($v_{ch}$) may be a constant value that is derived using test or simulation results. In another embodiment, the characteristic velocity value ($v_{ch}$) can be calculated using Equation (4), shown below. The characteristic velocity equation ($v_{ch}$) shown below uses a stiffness coefficient of the front tire ($C_F$), a stiffness coefficient of the rear tire ($C_R$), the mass of the vehicle (m), the wheelbase (L), the distance from the center of gravity ("COG") of the vehicle to the front axle 107(*a*), and the distance from the COG of the vehicle to the rear axle 108(*b*).

$$v_{ch}^2 = \frac{C_F C_R L^2}{m(C_R b - C_F a)} \quad (4)$$

The stiffness coefficient of the front tire ($C_F$), the stiffness coefficient of the rear tire ($C_R$), and the vehicle mass (m) can be vehicle specific, or estimated in an attempt to be applicable to more than one specific vehicle. Therefore, the characteristic velocity ($v_{ch}$) can be tuned according to the vehicle.

The reference yaw rate ($\dot{\psi}_{Ack}$) calculation, as shown in Equation (5), can be completed using the characteristic velocity ($v_{ch}$), the wheelbase (L), the angle at which the wheels are turned (δ), and the longitudinal velocity ($v_x$).

$$\dot{\psi}_{Ack} = \frac{v_x \delta}{L\left[1 + \left(\frac{v_x}{v_{ch}}\right)^2\right]} \quad (5)$$

The reference yaw rate ($\dot{\psi}_{Ack}$) indicates the driver's intended yaw rate by considering the steering angle (δ).

Referring still to FIG. 4, the understeering indicator 330 ($K_{US}$) can be calculated using Equation (6), as shown below, using the reference yaw rate ($\dot{\psi}_{Ack}$), the actual yaw rate ($\dot{\psi}$), the target yaw rate ($\dot{\psi}_{TARGET}$), and the surface limited yaw rate ($\dot{\psi}_\mu$).

$$K_{US} = C_{US} \frac{\dot{\psi}_{Ack} - \max(\dot{\psi}, \dot{\psi}_{TARGET})}{\dot{\psi}_\mu} \quad (6)$$

In one embodiment, the reference yaw rate ($\dot{\psi}_{Ack}$) is calculated using Equation (5) (step 440). The actual yaw rate ($\dot{\psi}$) can be determined using the yaw rate sensor 135. The surface limited yaw rate ($\dot{\psi}_\mu$) can be defined as the maximum yaw rate that a driving surface (e.g., asphalt, gravel, concrete, etc.) can sustain, and can be estimated (step 445) using a plurality of vehicle characteristics (e.g., velocity, wheel slip, etc.). The target yaw rate ($\dot{\psi}_{TARGET}$), represents a yaw rate value that does not cause the vehicle 100 to appreciably oversteer or understeer, and, as described with respect to step 205 of FIG. 2, can be generated through testing or simulation (step 450). Other methods of calculating or estimating target yaw rate ($\dot{\psi}_{TARGET}$) and the surface limited yaw rate ($\dot{\psi}_\mu$) are known in the art, and will therefore not be described in detail herein. In other embodiments, the surface limited yaw rate ($\dot{\psi}_\mu$) and the target yaw rate ($\dot{\psi}_{TARGET}$) are generated by another system (e.g., the braking module 150) and passed to the torque control module 155. Similar to the oversteering indicator 335 ($K_{OS}$), the understeering indicator 330 ($K_{US}$) can be calculated and normalized using a gain ($C_{US}$) (step 455). The normalization gain ($C_{US}$) is used to scale the understeering indicator 335 ($K_{OS}$) to a value between 0 and 1, so that it may be more readily compared to the oversteering indicator 335 ($K_{OS}$). The gain ($C_{US}$) can be altered according to the requirements of the vehicle 100.

As previously described, the instability indicator (K) 340 is calculated by subtracting the understeering indicator from the oversteering indicator, as shown in Equation (7) below (step 415).

$$K = K_{OS} - K_{US} \quad (7)$$

Referring back to FIG. 2, after the target condition has been generated (step 205) and the instability indicator has been calculated (step 210), an evaluation of the driver's input is made (step 215), as well as a decision to modulate the driver's torque request using the torque control module 155 (step 220). In an embodiment, steps 215 and 220 can be carried out using a torque control modulation module 600, shown in FIG. 6. The torque control modulation module 600 can generate a torque control function using sub-process 700, shown in FIG. 7.

Figure 6:
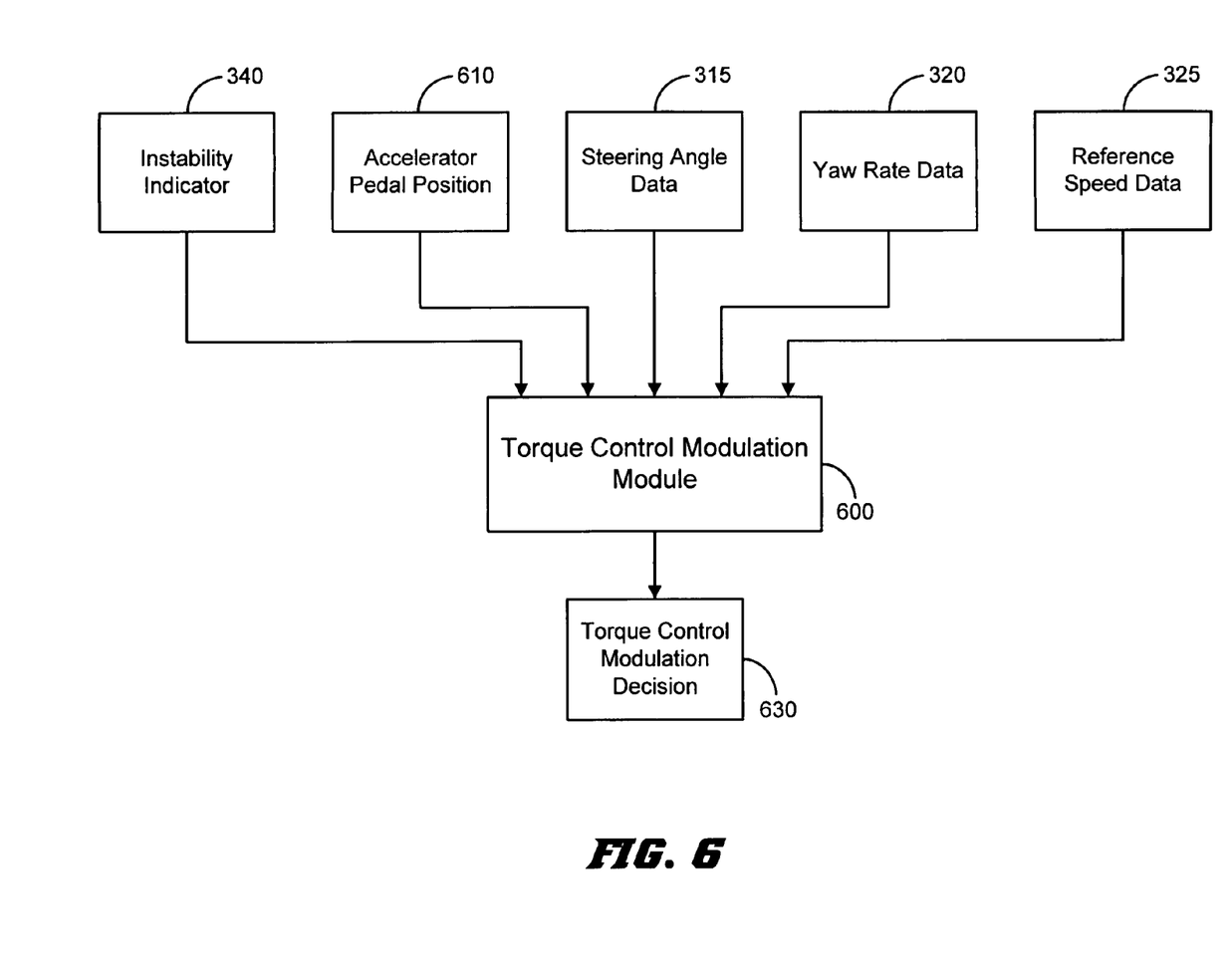
FIG. 6 illustrates an embodiment of a torque control modulation module.
Figure 7:
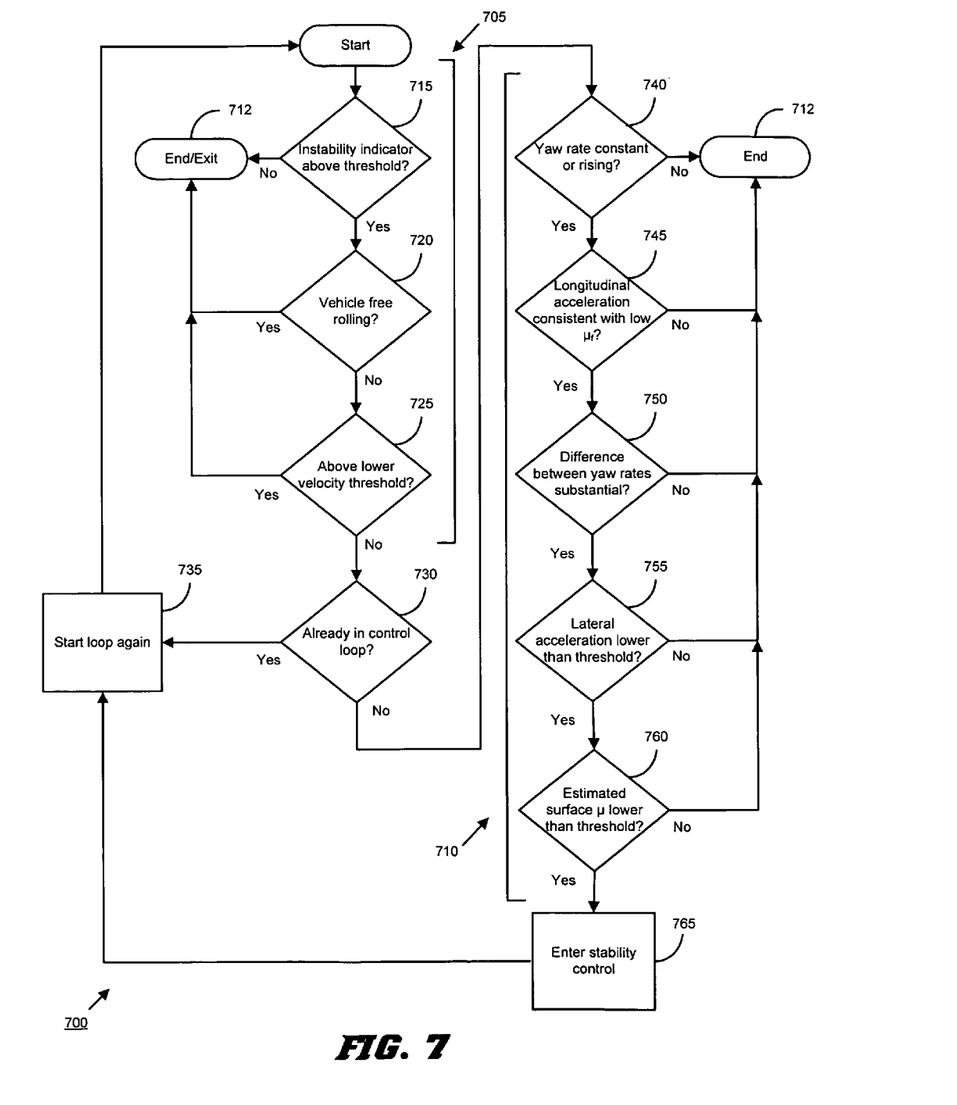
FIG. 7 illustrates an exemplary process that can be used to determine whether to transfer torque control.

Referring to FIG. 6, similar to FIG. 3, the torque control modulation module 600 utilizes a plurality of vehicle data to carry out the sub-process 700 (FIG. 7). The plurality of vehicle data may be acquired from the plurality of signals that are transmitted by the sensors shown in FIG. 1. For example, steering angle data 315, yaw rate data 320, and reference speed data 325, may be acquired using the steering angle sensor 130, the yaw rate sensor 135, and the wheel speed sensors 125, respectively. Additionally, the instability indicator 340 (FIG. 3) and accelerator pedal position data 610 can be used to provide data to the torque control modulation module 600. The accelerator position data 610 may be acquired using the accelerator pedal position sensor 133 (FIG. 1).

Referring now to FIG. 7, the sub-process 700 can be carried out by the torque control modulation module 600 to decide whether to modulate the driver's torque request. For example, the driver's torque request may be supplemented or altered (i.e., modulated) in order to help attain a stable vehicle condition. Therefore, in one embodiment, the sub-process 700 evaluates the driver's input and decides whether to transmit a torque module generated torque signal (i.e., the torque signal generated by the torque control function) to the differential. In some embodiments, the sub-process 700 is implemented in software using the torque control module 155. In such embodiments, the torque control module 155 may repeat the sub-process 700 continuously. The time that the torque control module takes to complete the sub-process (i.e., the cycle time), however, may vary according to the capabilities of the controller 145.

The sub-process 700 is a control loop that can be split into entry and exit process conditions 705 and entry only process conditions 710. In some embodiments, all of the conditions 705 of the entry and exit process as well as the entry only process conditions 710 must be true for the torque control module 155 to decide to modulate the driver's torque request (step 220 of FIG. 2). To remain in the sub-process 700, however, only the entry and exit process conditions 705 need to be satisfied.

The sub-process 700 first verifies the entry and exit process conditions 705. If any of the conditions 705 within the entry and exit process are not satisfied, the sub-process 700 is ended (step 712). In some embodiments, after ending the sub-process 700, the torque control module 155 waits until the next controller cycle to begin the sub-process 700 again.

A first condition of the entry and exit process conditions is having the instability indicator rise above a threshold (step 715). The instability indicator threshold may be determined by the Equations (1-7) using theoretical or simulated values for the variables. Alternatively or additionally, the threshold may be determined through vehicle testing. To avoid toggling control between the driver and the torque control function, a hysteresis may be implemented to provide a range of threshold values. In some embodiments, the hysteresis window is only implemented in cycles subsequent the initial decision to modulate the driver's torque request. Additionally, in other embodiments, in the event that the instability indicator 340 falls below the threshold, use of the torque control function may continue as long as the driver is not counter-steering, the torque control function was being used in the previous cycle, and the torque control function is not requesting a torque greater than a threshold. The threshold may be based on, for example, the amount of torque that is available from the wheel.

A second condition of the entry and exit process conditions is that the vehicle 100 is not free rolling (i.e., torque from the engine is not being applied to the wheels 103-106) (step 720). If the vehicle 100 is coasting (e.g., the transmission is in neutral), there can be no control of the engine torque that is applied to the wheels. Similarly, if the velocity of the vehicle is not above a certain threshold (step 725), torque control is not implemented. The torque control function can be designed to be implemented prior to a braking situation.

If the conditions 715-725 are satisfied and the torque control function is already being implemented (step 730), the torque control function can remain in effect (step 735) and the entry and exit process conditions can be repeated. However, if the torque control function is not already being implemented, the entry only process conditions 710 needs to be satisfied prior to deciding to modulate the driver's torque request.

A constant or rising yaw rate condition (step 740) indicates that there is a potential for the vehicle to become unstable. Generally, the torque control function is not used in straight-line driving conditions. A low longitudinal acceleration can indicate that a surface has a low coefficient of friction (step 745), which has the potential to produce an unstable condition. For example, in one embodiment, the longitudinal acceleration is compared to the accelerator pedal position. If an acceleration request is inconsistent with the longitudinal acceleration that is actually produced, it is likely that the road surface has a low coefficient of friction.

In one embodiment, the difference between the driver's intended yaw rate (i.e., the reference yaw rate) and the actual yaw rate must be greater than a certain value (step 750) before the torque control function is implemented. The driver's intended yaw rate can be calculated using Equation (5). A substantial difference between the driver's intended yaw rate and the actual yaw rate may be present if the driver is turning the wheel and is requesting acceleration on a low friction surface. Additionally, the actual lateral acceleration should be lower than a threshold (step 755). The threshold may be set, for example, using simulated or vehicle tested lateral acceleration limits that still allow effective vehicle stability control using the torque control function. The entry only conditions 710 also require that an estimated driving surface coefficient of friction be lower than a threshold (step 760).

If all of the entry only conditions 710 are satisfied, the torque control module 155 can be used to modulate the driver's torque request, and the process 700 can be repeated. As previously described, once the torque control function is initiated, subsequent cycles may only require that conditions 715-730 be satisfied for the torque control module 155 to remain in control.

Referring back to FIG. 2, the final step of the vehicle torque control process 200 is to determine the torque control function and transmit the corresponding torque signal to the differential (step 225). The differential can then apply torque to the wheels 103-106. In another embodiment, as previously described, the torque signal is sent to the engine of the vehicle, which then alters the torque that is produced by the engine.

Figure 8:
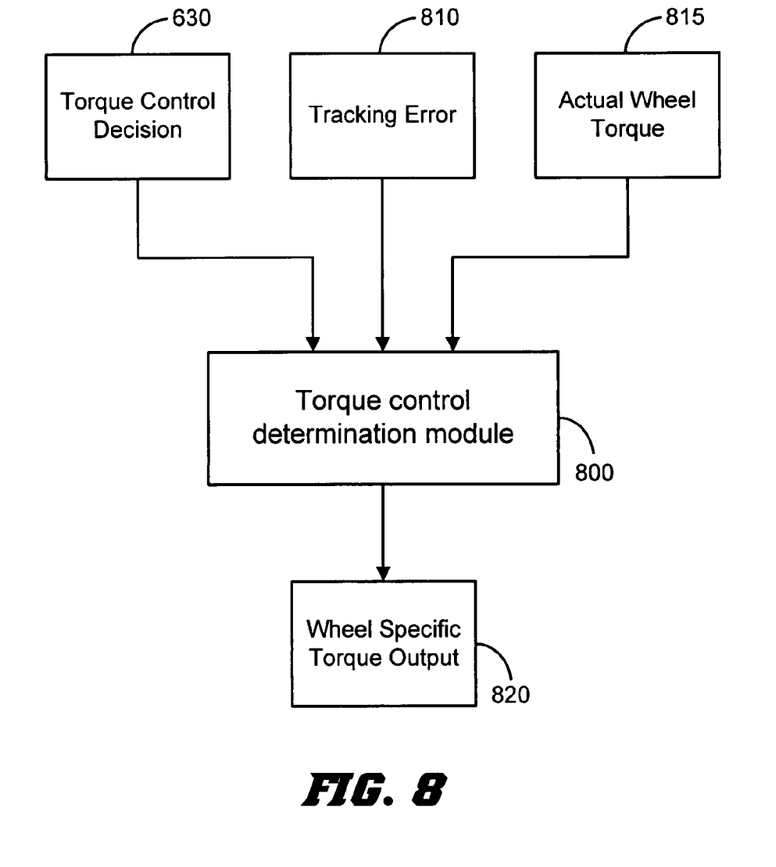
FIG. 8 illustrates an embodiment of a torque output module.
Figure 9:
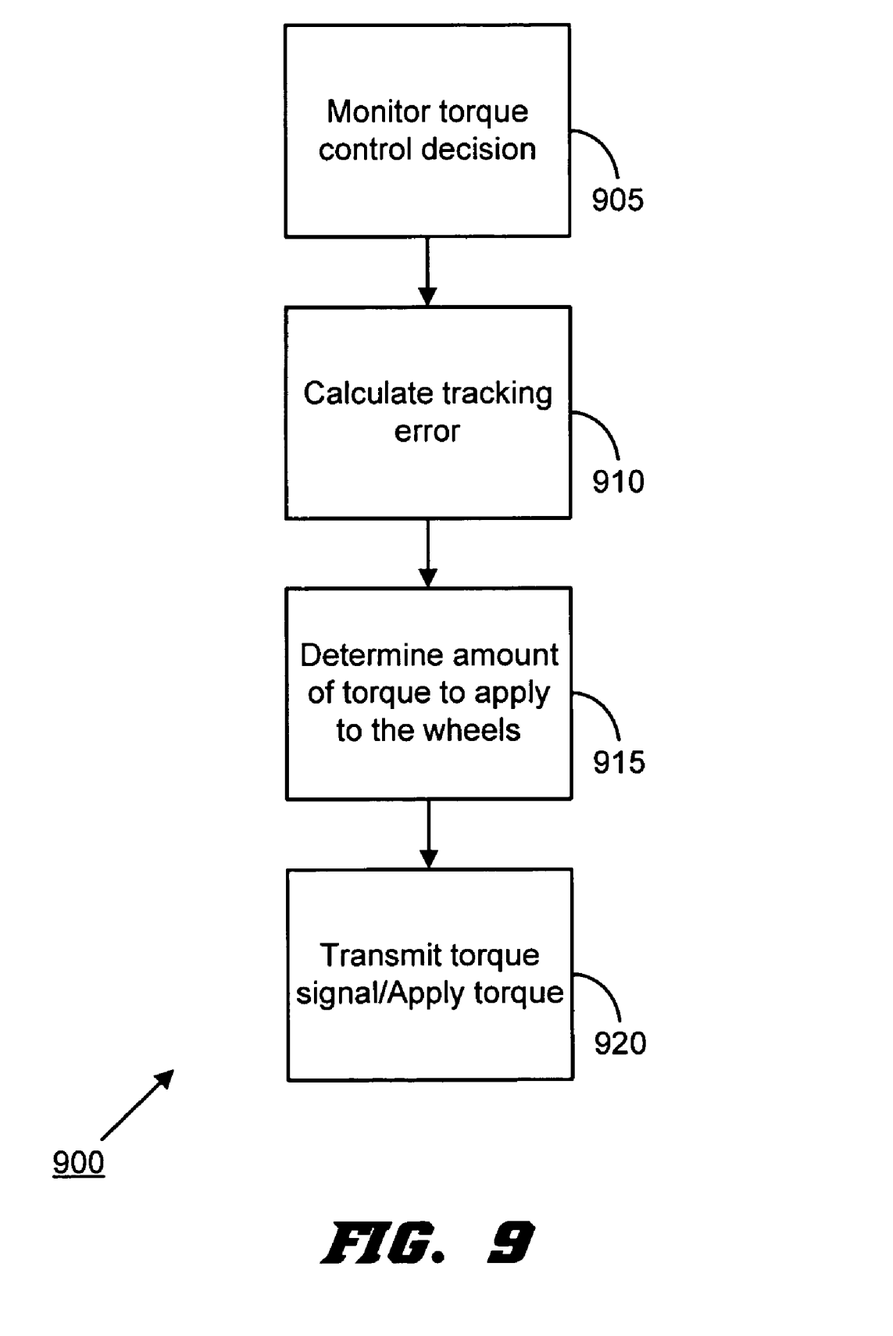
FIG. 9 illustrates an exemplary process that can be used to determine an amount of torque that is applied by the torque output module.

To determine the torque control function and the corresponding torque signal described above, the torque control module 155 uses a torque control determination module 800 (FIG. 8). The torque control determination module 800 has inputs including a torque control modulation decision 630 (from the torque transfer evaluation module 600), a tracking error 810, and an actual wheel torque 815. The torque control determination module 800 determines a wheel specific torque for each wheel 103-106 of the vehicle 100 (i.e., the torque control function and corresponding torque signal) based on the inputs 630, 810, and 815, and according to the torque application sub-process 900.

As shown in FIG. 9, the torque application sub-process begins by monitoring the torque control decision 630 (step 905). If the torque control decision 630 indicates that there is a need to modulate the driver's requested torque, the tracking error 810 is calculated (step 910). In some embodiments, the tracking error (e(k)) is the difference between a target stability indicator ($K_{\beta TARGET}$) and the instability indicator (K) 340, as shown in Equation (8) below:

$$e(k) = K_{\beta TARGET} - K \tag{8}$$

The target stability indicator, as described with respect to step 205 of FIG. 2, definition of the target can vary, but should allow the vehicle to turn without excessively oversteering or understeering. In some embodiments, the target stability indicator is a constant that is compared to the instability indicator 340. The normalized constant can be developed through simulations and testing, and take into account a variety of characteristics such as lateral acceleration, yaw rate, vehicle speed, and steering angle.

After calculating the tracking error (step 910), the amount of torque that is to be applied to each of the wheels 103-106 is determined (step 915) using the torque control function. In some embodiments, the torque control function, as shown in Equation (9) below, is used to produce the torque signal that is applied to each of the wheels u(k). The torque signal u(k) can depend on the tracking error (e(k)) and a feed forward condition ($u_{FF}$).

$$u(k) = u_{FF}(0) + K_P e(k) + K_I \sum_k e(k) \tag{9}$$

The feed forward condition ($u_{FF}$) can be implemented in a variety of ways to provide an initial torque value for the torque control function. For example, in one embodiment, the feed forward condition ($u_{FF}$) is based on an initial torque value that is being applied to the wheels 103-106. In other embodiments, the feed forward condition ($u_{FF}$) could be a variety of other torque values. In one embodiment, the torque control module 155 includes a proportional-integral ("PI") control capability. Therefore, the $K_P$ and $K_I$ parameters (such as variables or fixed values based on adaptive control) can represent proportional and integral gains, which are applied by the torque control module 155. In other embodiments, a different type of control could also be implemented (e.g., proportional-integral-derivative ("PID") control, adaptive PID, or the like).

Applying torque to the wheels (step 920) can be implemented using the front differential 110, rear differential 115, center differential (not shown), or combination of differentials as previously described. Determining the amount of torque that is to be applied to the wheels (step 915) using the torque control function can continue as long as the conditions of sub-process 700 are satisfied. Additionally, the amount of torque that is applied using the torque control function can vary according to changing driving conditions and driver input requests, as described with respect to FIG. 10.

In some embodiments, it is beneficial to apply the torque control function prior to applying a brake control function. One advantage to such a torque-function-before-brake-function process is an overall reduction in stability system noise.

For example, the stability control provided by the torque control function can be, in some cases, less noticeable to the driver of the vehicle than the stability control provided by the brake control function. However, if modulating the driver's torque request is not sufficient to stabilize the vehicle 100, the brake control function can be implemented, as shown in FIG. 10.

Figure 10:
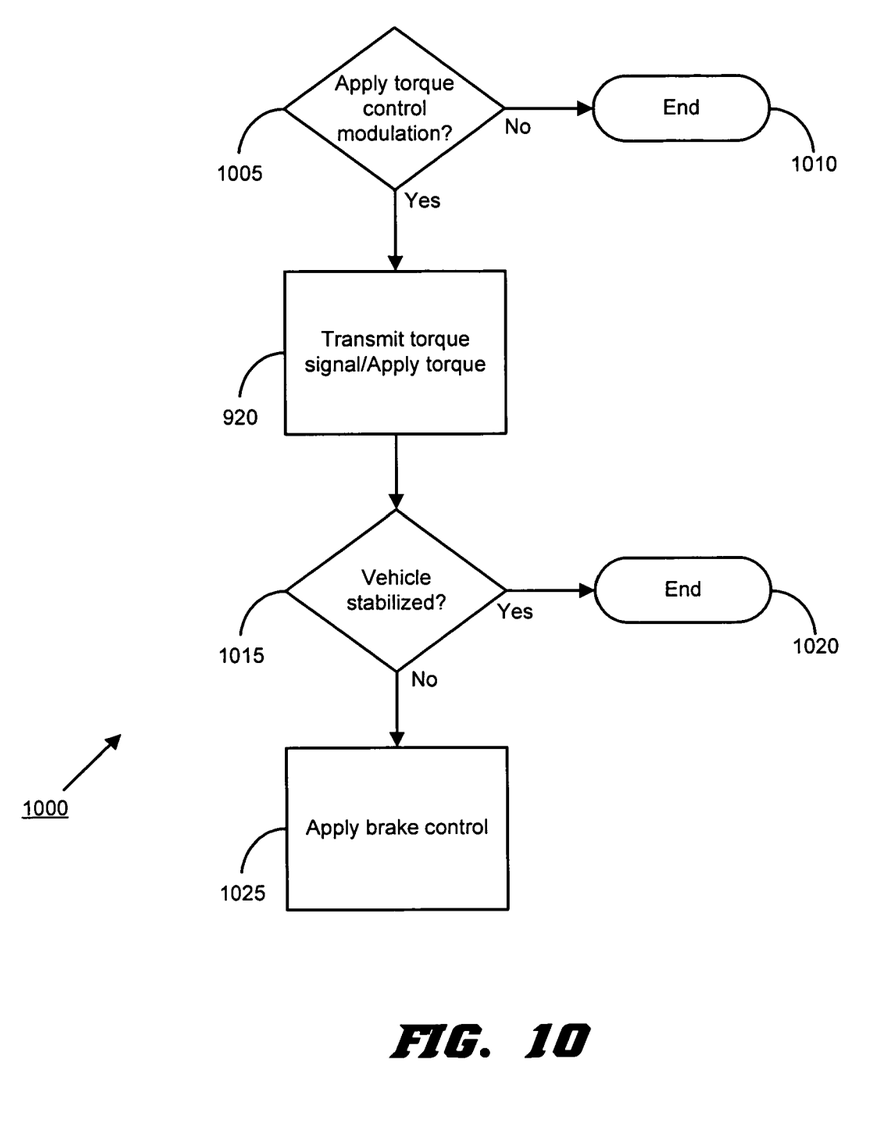
FIG. 10 illustrates an exemplary process in which braking control can be applied after applying torque control.

FIG. 10 illustrates a process 1000 that can be used to implement torque-function-before-brake-function control or stabilization. In one embodiment, as previously described, the sub-process 700 can be used to determine if a torque control modulation or (more broadly stability control) is needed (step 1005). If a modulation of the driver's torque request is not required, the process 1000 ends. If a torque control modulation is needed, the torque control signal of the torque control function is generated and applied (step 920). After applying the torque control signal, the stability of the vehicle is verified or checked (step 1015). In some embodiments, checking vehicle stability can be accomplished by calculating the understeering and oversteering indicators (FIG. 4). For example, if the vehicle 100 is not understeering or oversteering, stability can be assumed. If stability is attained by applying the torque signal, the process 1000 ends 1020. However, if the vehicle continues to exhibit an indication of instability, the brake control function can be applied. As previously described, the brake control function can include applying a different amount of braking force to each of the wheels 103-106 using a brake-based ESC system. In other embodiments, the order in which the steps of the process 1000 are carried out can be altered. For example, in one embodiment, the application of the torque control function (step 920) does not have to be completed prior to beginning the braking function (step 1025). In such an embodiment, the torque control function can be applied in parallel to the braking function (i.e., both the torque control function and brake control functions are applied at the same time). The process 1000 can be repeated with every cycle of the process 200, if desired.

Figure 11:
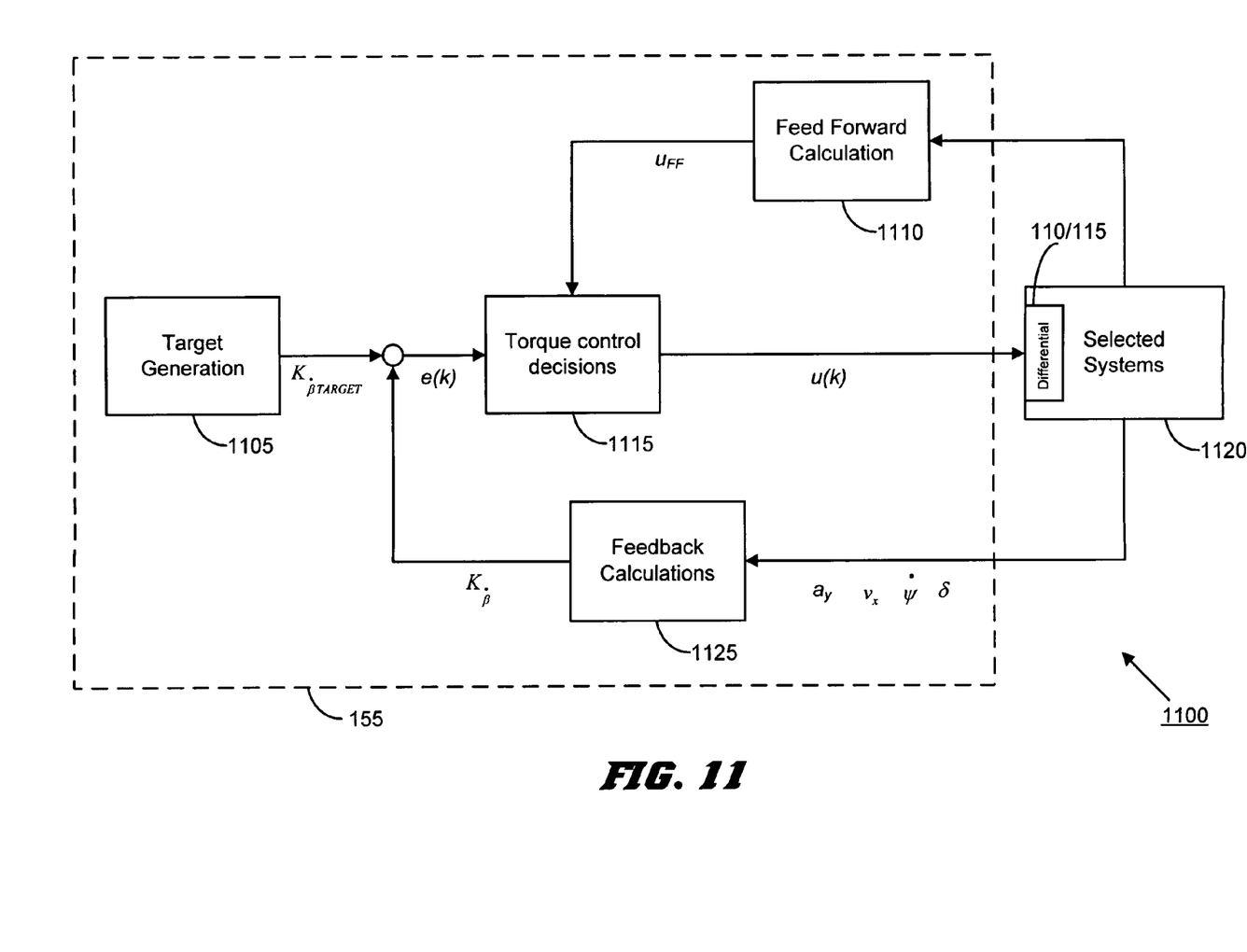
FIG. 11 illustrates an exemplary vehicle stability control system.

FIG. 11 provides an exemplary diagram 1100 of a vehicle stability control system that implements the torque control process 200. The diagram 1100 includes generating a target (block 1105), determining a feed forward value (block 1110), making torque control calculations (block 1115), applying a torque to a vehicle differential (block 1120), and making feedback calculations (block 1125) using selected vehicle systems. In some embodiments, the diagram blocks 1105-1115 and 1120 represent processes that are carried out by the torque control module 155.

The target generation (block 1105) can represent the target generation step 205 of FIG. 2. Therefore, in one embodiment, the target stability indicator $K_{\beta TARGET}$ is produced by the target generation block 1105. The feed forward calculations (block 1110) are used to determine a feed forward variable. In one embodiment, as described above, the feed forward variable ($u_{FF}$) represents the initial torque that is being applied to the wheels. The torque control calculations (block 1115) can be used to decide whether to implement a torque modulation using the torque control function, and also decide how much torque control should be applied. For example, in one embodiment, the torque control calculations (block 1115) represent steps 215 and 220 of FIG. 2, wherein the driver input is evaluated, and the decision is made to modulate the driver's torque request. After the torque control decision is made, a torque control signal (u(k)) is transmitted to the differential of the vehicle.

After a torque control signal (u(k)) has been applied, selected vehicle systems (block 110) transmit signals that are used in the feedback calculations (block 115). In some embodiments, the selected vehicle systems include the wheel speed sensors 125, the steering angle sensor 130, the accelerator pedal sensor 133, the yaw rate sensor 135, and the acceleration sensor 140. The signals from the selected vehicle systems (block 110) are used to develop the instability indicator (K). Finally, the instability indicator (K) is used by the torque control calculations (block 115), and the process is repeated.

Various features and aspects of embodiments of the invention are set forth in the following claims.

The invention claimed is:

1. A vehicle stability system for a vehicle, the system comprising;
    a yaw rate sensor configured to generate an output indicative of a yaw rate of the vehicle;
    an acceleration sensor configured to generate an output indicative of a lateral acceleration of the vehicle;
    a steering sensor configured to generate an output indicative of a steering angle;
    a torque request sensor configured to generate an output indicative of a driver's requested torque of the vehicle; and
    a controller configured to:
    calculate an oversteering indicator based on at least one of the outputs of the yaw rate sensor, the lateral acceleration sensor, the steering sensor, and the torque request sensor;
    calculate an understeering indicator based on at least one of the outputs of the yaw rate sensor, the lateral acceleration sensor, the steering sensor, and the torque request sensor;
    determine a need to modulate the driver's requested torque based on an instability indicator determined by the oversteering indicator, the understeering indicator, and feedback calculations;
    calculate a tracking error by comparing a target stability indicator and the instability indicator;
    generate a wheel specific modulated torque signal, based on the tracking error and a feed forward calculation; and
    transmit the modulated torque signal to at least one differential of the vehicle.

2. The vehicle stability system of claim 1, wherein the oversteering indicator is further calculated based on a lateral acceleration of the vehicle, the output of the yaw rate sensor, and a longitudinal velocity of the vehicle.

3. The vehicle stability system of claim 1, wherein the understeering indicator is further calculated based on a reference yaw rate, a target yaw rate, and a surface limited yaw rate.

4. The vehicle stability system of claim 1, wherein the yaw rate sensor and the acceleration sensor are combined in a single module.

5. The vehicle stability system of claim 1, further comprising a vehicle bus operable to transfer outputs from the sensors to other components.

6. The vehicle stability system of claim 1, wherein the controller is configured to transmit a braking signal to a braking system in addition to transmission of the torque signal.

7. The vehicle stability system of claim 1, wherein the controller is configured to generate multiple torque signals for transmission to multiple differentials.

8. The vehicle stability system of claim 1, wherein the output of the acceleration sensor is adjusted to compensate for banked surface conditions.

* * * * *